June 28, 1932. H. B. FORESMAN 1,864,994
WEATHER STRIP FOR SLIDING CLOSURES
Filed Feb. 19, 1930 2 Sheets-Sheet 1
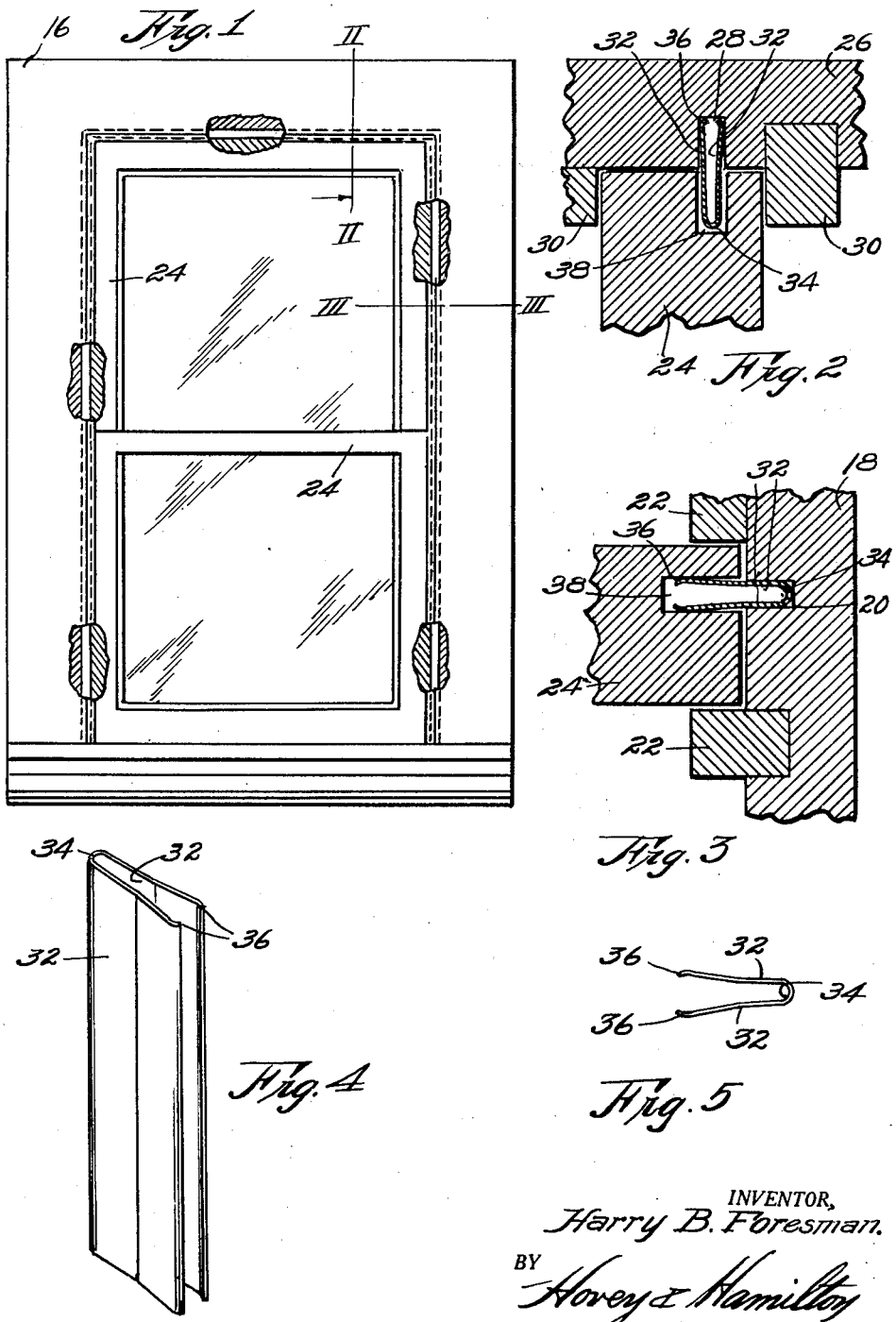
INVENTOR,
Harry B. Foresman.
BY Hovey & Hamilton
ATTORNEYS.

June 28, 1932.  H. B. FORESMAN  1,864,994
WEATHER STRIP FOR SLIDING CLOSURES
Filed Feb. 19, 1930   2 Sheets-Sheet 2
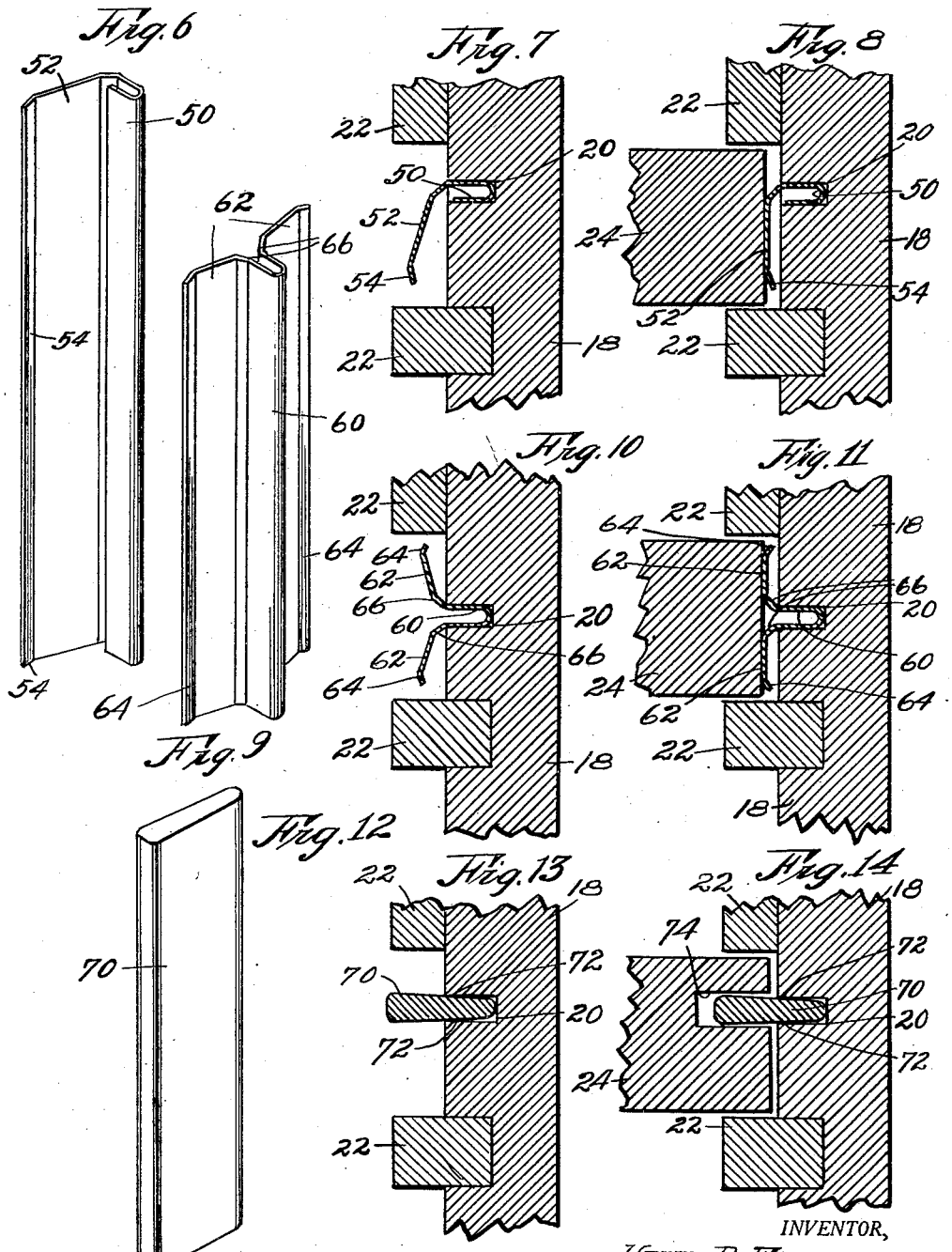
INVENTOR,
Harry B. Foresman.
BY
Hovey & Hamilton,
ATTORNEYS.

Patented June 28, 1932

1,864,994

UNITED STATES PATENT OFFICE

HARRY B. FORESMAN, OF ENID, OKLAHOMA, ASSIGNOR TO LOCK JOINT WINDOW COMPANY, OF KANSAS CITY, MISSOURI, A CORPORATION OF DELAWARE

WEATHERSTRIP FOR SLIDING CLOSURES

Application filed February 19, 1930. Serial No. 429,729.

This invention relates to weather strip and its novel combination with sliding closures and the primary object of the invention is to provide effective weather stripping for sliding closures which is easy to apply and which has sealing qualifications which renders the strip adaptable for use with various kinds of structures.

One of the objects of the present invention is the provision of a sealing strip for closures which may be affixed in place without the use of rigid attaching elements; the strip having inherent qualities which are utilized to maintain the strip in the operative position.

Another object of the invention is the contemplation of a weather strip which is easily and quickly attachable to closure structures which have previously been formed to receive the strip. The attachment being effected through the use of the special formation of the closure structure and the novel features built into the weather strip itself.

Another object of the instant invention is to provide a resilient sealing strip for closures which may be loosely mounted between the relatively movable parts of the closure in a manner which renders the use of special tools and special work unnecessary.

An even further object of this invention is to provide a resilent weather strip for closures that is durable, inexpensive to manufacture, exceptionally easy to install, and, above all, efficient and effective in its operation, the results produced being highly desirable over the results now obtained from the well known rigidily attached weather stripping.

A yet further object of this invention is to provide novelty formed weather stripping which may be mounted within the closure casing by frictional engagement therewith and which has projecting parts adapted to yieldingly engage the movable sash of the closure in such a manner that the varying size of the space between the members of the closure is effectively sealed by the weather strip.

Many minor objects of this invention will appear during the course of the detailed specification wherein novel points of construction are specifically set forth and wherein many forms of construction are described, all of which embody the features contemplated by this invention.

Referring to the accompanying drawings wherein the preferred and three modified forms of the invention are shown, Figure 1 is an elevation of a window structure equipped with weather strips made in accordance with this invention, parts being broken away for clearness.

Fig. 2 is an enlarged fragmenary vertical section of the window structure taken on line II—II of Fig. 1.

Fig. 3 is an enlarged horizontal cross section of the window structure taken on line III—III of Fig. 1.

Fig. 4 is a perspective view of a short length of weather stripping made in accordance with the preferred form of this invention.

Fig. 5 is an end view of the same.

Fig. 6 is a perspective view of a short length of weather stripping made in accordance with one modified form of the invention.

Figs. 7 and 8 are enlarged fragmentary sections showing the modified form of strip, illustrated in Fig. 6, before and after respectively, the window sash is in place.

Fig. 9 is a perspective view of a short length of weather stripping made in accordance with the second modified form of the invention.

Figs. 10 and 11 are enlarged fragmentary sections showing the second modified form of strip, illustrated in Fig. 9 in place, before and after respectively, the window sash is in position.

Fig. 12 is a perspective view of a short length of weather stripping made in accordance with the third modified form of the invention.

Figs. 13 and 14 are enlarged fragmentary sections showing the modified form of strip, illustrated in Fig. 12 in place, before and after respectively, the window sash is in position.

Like reference characters refer to similar parts throughout the several views, and the numeral 16 indicates a window frame having a stile 18 which should be provided with a groove 20 to receive weather stripping made in accordance with this invention. The customary stops 22 supported by the stile 18 are spaced apart sufficiently to receive the slidably mounted sash 24 therebetween. As clearly illustrated in the drawings the groove 20 is positioned intermediate stops 22 in a manner which will permit the hereinafter described weather strip to effectively engage the adjacent edge of sash 24.

In the case of the preferred form, the head plate 26 is also provided with a groove 28 and carries the stops 30 between which the upper edge of sash 24 is positioned when the same is closed and the weather stripping is sealing any space which may be formed at this point.

Specifically referring to the details of construction shown in the preferred form of this invention shown in Figs. 1 to 5 inclusive, the weather strip itself should be formed of resilient sheet metal longitudinally rebent upon itself to form a pair of arms 32 which progressively diverge as their outer edges are approached. The edge formed by the longitudinal rebending of the resilient material should be arcuate in cross section as shown at 34 and the space between arms 32 adjacent edge 34 should be great enough to allow frictional engagement with the side of groove 20 formed in stile 18 when the weather strip is being installed. As is clearly shown in Figs. 4 and 5, the outer portion of arms 32 from a point intermediate their width, is projected at a greater angle of divergency than the portion immediately adjacent the rebent edge 34, and, the outer edges of each arm respectively is curved inwardly out of the plane of the arm to form a slight curl 36 which releases any possibility of objectionable scraping or friction as the sash 24 is moved therealong. As shown in Fig. 3, a groove 38 is formed along the sides of each sash 24 and across the top of the upper sash. When the weather strip is positioned to seal the space formed between the sides of sash 24 and stile 18, the rebent edge 34 is forced into groove 20 and the diverging arms 32 are forced together and into groove 38 formed in the adjacent edge of sash 24. In this manner the resiliency and yielding nature of the strip allows it to follow the edges in groove 38 as the sash 24 is raised and lowered. Also in the case of any lateral movement on the part of sash 24, arms 32 will flex from side to side and maintain a complete seal at all times.

In placing the weather stripping made in accordance with the preferred form of the invention along the top of sash 24, the method of inserting the same into grove 28 formed in plate 26 is reversed and rebent edge 34 is allowed to project and enter groove 38 formed along the top edge of shash 24 when the sash 24 is closed. In this way there is no possibility of difficulty arising when the strip and sash meet.

Figs. 6, 7 and 8 illustrate one of the modified forms of the invention and the strip in this instance is formed as shown to present a longitudinally rebent portion 50 which frictionally engages groove 20 formed in stile 18 when the resilient weather strip is installed. The extended longitudinal apron 52 projects toward the adjacent edge of sash 24 and slidably engages the edge of the sash as shown in Fig. 8. The break along the projected edge of the strip removes the edge and longitudinal margin 54 from contact with the edge of sash 24 in a fashion which allows but a smooth face to yieldingly and slidably engage the edge of sash 24. Obviously the space between sash 24 and stile 18 will be closed at all times by strip apron 52.

Figs. 9, 10 and 11 illustrate the second modified form of constructing a weather strip in accordance with this invention. The material used is preferably resilient sheet metal and a rebent portion 60 may be formed longitudinally of the strip intermediate the edges thereof as shown. As before set down, the distance between the walls of rebent portion 60 should be great enough to frictionally engage within the groove 20 which will maintain the strip in position without further attachment. Walls 62 extend outwardly and to each side respectively of rebent portion 60 to yieldably engage the edge of sash 24 when the same is in position as shown in Fig. 11.

The outer edges of the strip should be broken to form turned back margins 64 to insure a smooth engaging surface and an angled wall 66 may be provided between walls 62 and the rebent portion 60. Thus the use of a resilient strip as shown in Figs. 9, 10 and 11 may be used to effectively seal the space formed between sash 24 and stile 18. Lateral movement of the sash 24 is permitted through this construction without breaking the seal.

Figs. 12, 13 and 14 illustrate a third modification of this invention. The strip itself in this instance, may be of hard wood or similar non-flexible material. This strip 70 is tapered from one of its edges to the other and should be provided with rounded edges as shown. When the strip is moved into position by introducing the thinnest edge of the same into groove 20 formed in stile 18, it is obvious that the edges of the groove will contact the side of strip 70 at 72 to form a fulcrum point. In this instance, a groove 74 is formed along the edge of sash 24 for the reception of the thicker edge of strip 70. As clearly indicated in Fig. 14, groove 74 is wider than groove 20. The space formed between the edge of sash 24 and the stile 18 is thereby bridged and closed by a strip 70 which permits lateral movement of sash 24 without binding. In the case lateral movement is imparted to sash 24, strip 70 merely rocks on the fulcrum edges 72 and follows the sash 24 without binding.

It is obvious that weather stripping made in accordance with this invention is quickly and easily applied and maintains itself in the operative position without the use of screws, nails, brads or any other form of rigid attaching devices. Since the grooves required to receive the weather stripping are all formed when the sash and frames are made, no alteration of the same is required when the weather stripping is to be positioned a considerable time after the window structure is installed.

It is understood that many modifications in the specific construction of devices made in accordance with this invention might be made without departing from the scope of the appended claims.

What is claimed and desired to be secured by Letters Patent is:

1. A window structure comprising a frame, including side stiles; grooves formed by the stiles; frames slidably mounted between said stiles; grooves formed by the frames along the sides thereof in direct opposed relation to the grooves formed by the stiles; and a strip of tapered cross-section extending into the grooves of stile and frame, whereby the same is floatingly positioned in the operative position to permit of a transverse rocking movement of the strip.

2. A window structure comprising a frame, including side stiles, grooves formed by the stiles; frames slidably mounted between said stiles; grooves formed by the frames along the sides thereof in direct opposed relation to the grooves formed by the stiles; and a strip extending into the groove of stile and frame and bridging the space therebetween, said strip being of solid nonflexible material, tapered from one of its edges to the other, the thinnest edge thereof projecting into the groove formed by said stile whereby the edges of said groove act as fulcrums allowing lateral movement of the thicker edge of said strip as the sash is moved.

3. A window structure comprising a frame, including side stiles, grooves formed by the stiles; frames slidably mounted between said stiles; grooves formed by the frames along the sides thereof in direct opposed relation to the grooves formed by the stiles; and a strip extending into the grooves of stile and frame and bridging the space therebetween, said stile groove being narrower than the adjacent sash groove; said strip being tapered with its thinnest edge in the stile groove and its thickest edge in the opposed sash groove, the edges of said stile groove bearing against the opposite sides of said strip to act as fulcrum edges as the strip is moved laterally during the operation of the window sash.

4. A sliding closure having a frame and a sash; a groove formed in said frame, a groove formed in said sash and a sealing strip resiliently engaging the opposite side walls of both of said grooves respectively whereby the space formed therebetween is closed.

5. A window structure comprising a frame, including side stiles, grooves formed by the stiles; frames slidably mounted between said stiles; grooves formed by the frames along the sides thereof in direct opposed relation to the grooves formed by the stiles; and a strip extending into the groove of stile and frame and bridging the space therebetween, one of said grooves being narrower than the other of said grooves, said strip being tapered in cross section with its thinnest edge in the narrower groove, and its thicker edge in the wider groove, the edges of said narrower groove being against the opposite sides of said strip to act as fulcrums as the strip is moved laterally during the operation of the window sash.

In testimony whereof I hereunto affix my signature.

HARRY B. FORESMAN.